United States Patent
King et al.

(10) Patent No.: US 8,594,924 B2
(45) Date of Patent: Nov. 26, 2013

(54) METHOD OF MANAGING OPERATIONAL HEALTH OF ASSETS

(75) Inventors: Stephen P. King, Swadlincote (GB); Adrian Bird, Derby (GB); Paul A. Flint, Derby (GB); Daniel K. Goodall, Derby (GB)

(73) Assignee: Rolls-Royce, PLC, London (GB)

( * ) Notice: Subject to any disclaimer, the term of this patent is extended or adjusted under 35 U.S.C. 154(b) by 0 days.

(21) Appl. No.: 13/547,477

(22) Filed: Jul. 12, 2012

(65) Prior Publication Data
US 2013/0054056 A1 Feb. 28, 2013

(30) Foreign Application Priority Data
Aug. 23, 2011 (GB) .................................. 1114441.7

(51) Int. Cl.
- G05B 23/00 (2006.01)
- G05B 23/02 (2006.01)
- G01C 21/00 (2006.01)
- G01C 21/36 (2006.01)

(52) U.S. Cl.
USPC ................. 701/415; 701/3; 701/14; 701/423; 701/528

(58) Field of Classification Search
USPC ............... 701/3, 14, 528, 415, 423; 318/565, 318/568.24–568.25; 340/3.1–3.9
See application file for complete search history.

(56) References Cited

U.S. PATENT DOCUMENTS

| | | | |
|---|---|---|---|
| 6,381,538 B1 * | 4/2002 | Robinson et al. | 701/439 |
| 7,191,064 B1 | 3/2007 | Myers et al. | |
| 7,302,339 B2 * | 11/2007 | Gray | 701/36 |
| 7,383,131 B1 | 6/2008 | Wey et al. | |
| 7,471,995 B1 | 12/2008 | Robinson | |
| 7,868,811 B1 | 1/2011 | Woodell et al. | |
| 2006/0170535 A1 * | 8/2006 | Watters et al. | 340/10.41 |
| 2007/0005202 A1 * | 1/2007 | Breed | 701/29 |
| 2007/0271014 A1 * | 11/2007 | Breed | 701/29 |
| 2008/0108372 A1 * | 5/2008 | Breed | 455/456.1 |
| 2010/0010708 A1 | 1/2010 | Bailly et al. | |
| 2010/0174576 A1 * | 7/2010 | Naylor | 705/8 |

OTHER PUBLICATIONS

Dec. 15, 2011 Search Report issued in British Patent Application No. 1114441.7.

* cited by examiner

Primary Examiner — Mary Cheung
Assistant Examiner — Atul Trivedi
(74) Attorney, Agent, or Firm — Oliff & Berridge, PLC

(57) ABSTRACT

An asset operational health monitoring system, in which a plurality of sensors are arranged to determine values of asset operation parameters pertaining to an instance of asset operation. One or more processing unit receives data corresponding to said asset operation values and determine a plurality of asset locations at a corresponding plurality of points in time. The one or more processing unit is arranged to receive data indicative of the location of a region of adverse environmental conditions which may impact on the operation of the asset and to compare the determined locations of the asset with the location of said region so as to determine whether one or more of said asset locations fall within said region. An indicator of operational risk associated with the presence of said asset in said region is output which can drive asset operation or maintenance decision making. The system may be used for ash cloud impact monitoring for aircraft, a fleet of aircraft or aircraft engines.

19 Claims, 3 Drawing Sheets

METHOD OF MANAGING OPERATIONAL HEALTH OF ASSETS

The present invention relates to a method and system for managing the health of assets, such as machines, and more specifically, although not exclusively, to a method and system for managing assets which are airborne during operation.

Combustion engines for vehicles typically comprise an intake for air which is to be used in the combustion process. However the intake of ambient air exposes the internal workings of the engine to the external environmental conditions in the immediate vicinity of the engine. Accordingly an engine can experience multiple different inlet conditions in a single journey. Any pollutants, or other substances, borne by the air can thus pass into the engine and may affect its performance.

In the case of aircraft engines, ambient air is used not only for the combustion process itself, but also for a number of other purposes, including for thrust, lift, cooling and pressure/flow actuation of components or sub-systems. Accordingly the ambient air permeates a myriad of areas of the engine such that any contaminants within the air can adversely affect performance of the engine in a number of ways.

U.S. Pat. No. 7,471,995 discloses a method of monitoring environmental conditions in real time for a flight of an aircraft using on-board radar in combination with satellite transmission of environmental condition data for the proposed aircraft route in order to allow updating of the proposed travel route. The focus of that patent is therefore the avoidance of adverse environmental conditions.

The eruptions of the volcano Eyjafjallajökull in 2010 resulted in the grounding of many aircraft with intended flight paths through UK and European airspace in order to avoid ingestion of airborne volcanic ash into aircraft engines. However this course of action had the consequence of causing major disruption to aircraft operators, airports and passengers. Furthermore, the movements of airborne ash with air currents and the desire to maintain normal running of aircraft flights as far as possible had the combined result that a number of flights are believed to have flown through certain ash clouds. It is imperative to the ongoing safety of the aircraft that aircraft engines which have passed through ash clouds can be formally and accurately assessed.

It is an aim of the present invention to provide a method and system for managing the health of operational assets which can better account for varying environmental conditions. It may be considered an additional or alternative aim of the invention to provide a method and system for managing the health of operational assets which can mitigate against the impact of adverse environmental conditions on a fleet of aircraft.

According to one aspect of the present invention there is provided an asset operational health monitoring system, comprising: a plurality of sensors arranged to determine values of asset operation parameters pertaining to an instance of asset operation; one or more processing units arranged to receive data corresponding to said asset operation values and to determine a plurality of asset locations at a corresponding plurality of points in time; characterised in that the one or more processing unit is arranged to receive data indicative of the location of a region of adverse environmental conditions which may impact on the operation of the asset and to compare the determined locations of the asset with the location of said region so as to determine whether one or more of said asset locations fall within said region, wherein the one or more processing units outputs an indicator of operational risk associated with the presence of said asset in said region.

The present invention may advantageously allow for formal tracking or prediction of the passage of assets through adverse environmental conditions such that a common framework can be provided for assessment of the risks associated with such events.

The location of the asset and/or the region of adverse environmental conditions may comprise two-dimensional co-ordinates. Either, or both, locations may comprise, or further comprise, a height or altitude value, typically a height above ground level.

Either, or both, locations may comprise geographical locations and may comprise co-ordinates, such as values of latitude and/or longitude. In a further example of the invention, the location of the asset and/or region of adverse environmental conditions may comprise a three-dimensional definition.

The region of adverse environmental conditions may comprise a volume. The region of adverse environmental conditions may be defined as a polyhedron or polygon. A plurality of regions of adverse conditions may be defined. Said regions may correspond to different seventies of said adverse conditions.

A boundary or interface of said one or more regions of adverse conditions may be defined where an environmental condition parameter is approximately equal to a threshold parameter value.

The region of adverse conditions may comprise a region of pollutant, contaminant and/or airborne or fluid-borne material, such as a particulate material. The concentration of said material may be used to define the boundaries or interfaces of said one or more regions. The region may comprise an ash cloud, for example which corresponds to a specified density of ash particles.

The determination of asset location may be performed using or processing equipment health monitoring data. Such data may comprise city-pair and/or date/time information for one or more aircraft flights. Such data may comprise take-off and landing times. If not available within the EHM data, the start and end locations for the asset may be obtained, typically as GPS coordinates. The EHM data may comprise any or any combination of altitude, velocity/speed and direction of travel of the asset.

The indicator of operational risk may comprise a count of the number of instances of exposure of the asset to one or more regions of adverse environmental conditions. Additionally or alternatively, the indicator of operational risk may comprise a value of duration or level of exposure of the asset to said one or more regions. For a plurality of regions of adverse conditions, a different level of risk or severity of risk may be assigned to different regions. Such levels or seventies of risk may correspond to a concentration of contaminant within said region.

In one embodiment, the one or more processing unit outputs a maintenance indicator or decision for said asset. The indicator of operational risk may comprise the maintenance indicator or vice versa. The one or more processing unit may schedule maintenance for said asset based at least in part on said determination of operational risk.

The one or more processing unit may be arranged to receive EHM data for said asset and to model a plurality of operational risks, of which at least one risk is determined based upon the passage of said asset through said region of adverse environmental conditions. A maintenance decision may be output based on a combination of modelled operational risks for the asset.

The one or more processing units may comprise a plurality of processing units. A first processing unit may be arranged to receive the data corresponding to said asset operation values and to determine a plurality of asset locations there-from. The first processing unit may be arranged to communicate location data for the asset to a further processing unit, which determines and outputs said operational risks for said asset.

The asset may comprise a machine, typically complex machinery, such as an engine or associated equipment. The asset may comprise a vehicle or component thereof. The asset may comprise an airborne asset, such as an aircraft or component thereof. In one particular embodiment, the asset comprises a gas turbine engine.

According to a second aspect of the invention, there is provided a tool for the management of a plurality of operational assets, the tool being arranged to receive asset operation parameter data and to determine a plurality of asset locations at a corresponding plurality of points in time for an instance of asset operation; the tool being further arranged to receive data indicative of the location of a region of adverse environmental conditions for the asset and to compare the determined locations of the asset with the location of said region so as to determine whether one or more of said asset locations fall within said region, wherein the tool outputs an indicator of operational risk associated with the presence of said asset in said region.

According to one embodiment, the tool is an asset fleet management tool.

The tool may comprise machine readable instructions according to a further aspect of the invention.

According to a further aspect of the invention there is provided a method of monitoring the operational health of a machine, the method comprising: receiving data comprising asset operation parameter values and determining a plurality of asset locations at a corresponding plurality of points in time; receiving data indicative of the location of a region of adverse environmental conditions which may impact on the operation of the asset; comparing the determined locations of the asset with the location of said region so as to determine whether one or more of said asset locations fall within said region, outputting an indicator of operational risk associated with the presence of said asset in said region.

The method may comprise constructing an operational condition signature for said asset from the asset operation parameter values. The asset operation parameter values may comprise operational condition indicators or performance parameters. Such parameters may comprise any or any combination of operational temperatures, pressures, component rotation speeds and/or ambient environmental conditions.

The receiving of data indicative of the location of a region of adverse environmental conditions may comprise collecting a condition signature consisting of a plurality of geographical and altitude coordinates from one or more meteorological data capture systems. The region or condition signature may be defined as a volume in which particulate material is present.

The asset locations may be determined as, or converted into, GPS co-ordinates.

In one embodiment, the region of adverse conditions corresponds to a region in which the density or concentration of a contaminant is determined to be at or above a threshold value. A plurality of regions may be defined corresponding to different densities. Such regions may be associated with different sevenities or levels of operational risk for an asset.

According to a preferred embodiment, events corresponding to exposure of the machine to one or more of said regions of adverse conditions may be accumulated. Such an accumulated total or count may provide an operational risk indicator for the machine, upon which maintenance or other operational decisions can be taken or prioritised.

The method may comprise a method for evaluating the exposure of a gas-turbine system to adverse meteorological effects.

According to a further aspect of the invention, there is provided a data carrier comprising machine readable instructions for the operation of one or more processors to perform the method of the present invention.

Any of the features define above in relation to the first aspect of the invention may be applied to any of the further aspects of the invention.

One or more practicable embodiments of the present invention are described in further detail below with reference to the accompanying drawings of which:

The present invention may be considered to derive from the premise that regions of adverse environmental conditions for assets can be monitored along with the travel routes of said asset to evaluate formally the exposure of an asset to said adverse conditions. The result of that evaluation can be fed into an asset health monitoring system and thereby drive maintenance decisions for the asset.

The focus of the invention thus steers away from systems intended to facilitate avoidance of adverse environmental conditions per se and instead focuses on the capturing of incidences wherein an asset has undergone such adverse environmental conditions such that any operational risks associated therewith can be mitigated, typically retrospectively. Such adverse environmental conditions typically comprise transient and/or extreme environmental conditions.

The embodiments of the invention described below are applied to aircraft engines but may equally be applied to other airborne machinery such as aircraft components or the aircraft as a whole. Furthermore the invention may be applicable to other vehicles or craft which are powered by combustion engines and/or which are suitable for monitoring using conventional equipment health monitoring (EHM) techniques. The invention is particularly suited to high value assets, complex machinery and/or assets having a significant number of different failure modes.

Figure 1:
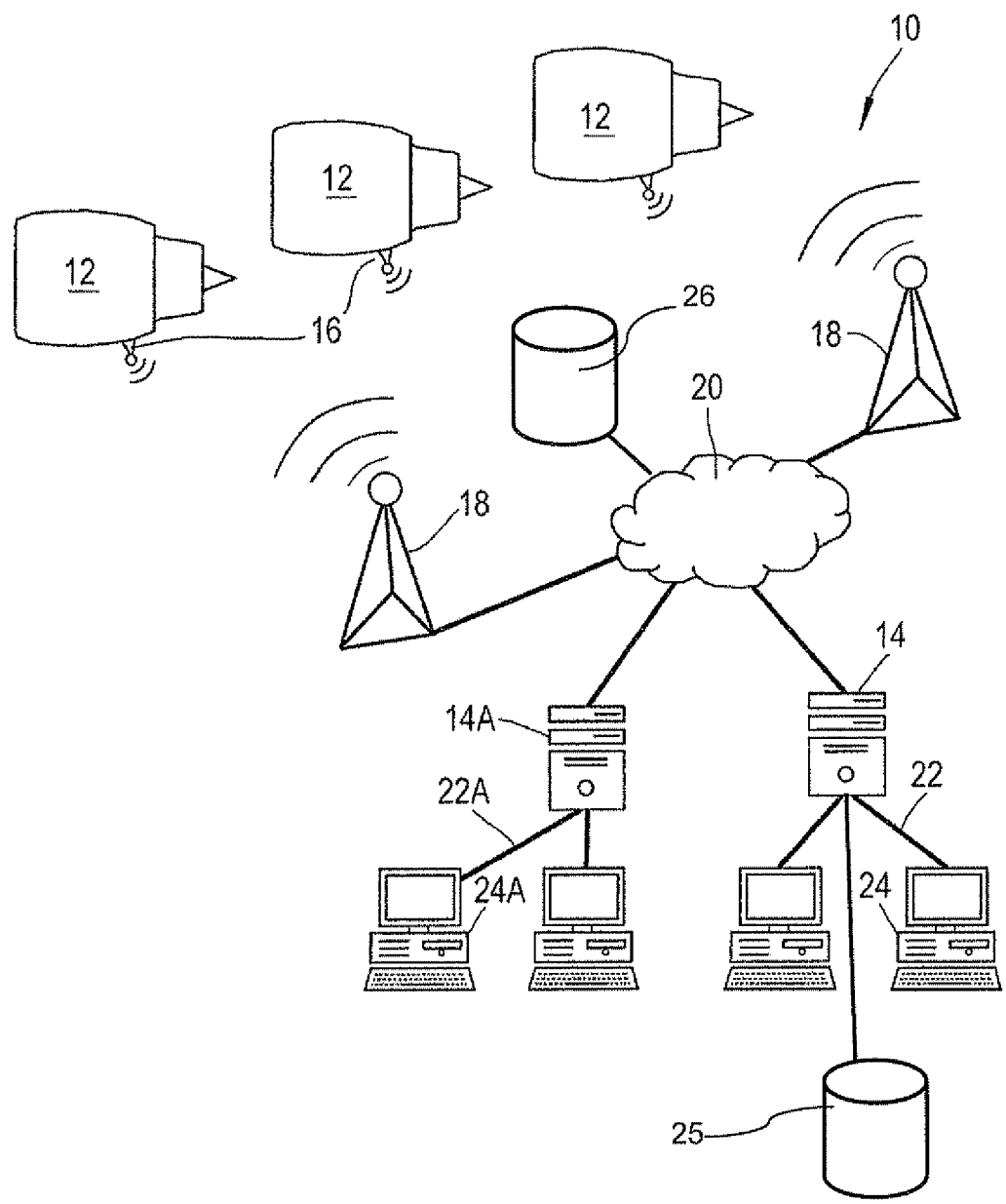
FIG. 1 shows a schematic of one embodiment of a system in which the present invention may be applied.

Turning now to FIG. 1, there is shown an overview of a system 10 in which the present invention may be incorporated. A plurality of gas turbine engines 12 are depicted which are in service or 'on wing' for a fleet of aircraft (not shown).

Data relating to the operation of each engine 12 is typically collected over the engine operational life using conventional sensors and comprises a measure of the duration of operation of the engine, such as, for example, by way of a record of the operational age, the number of operational hours or flight cycles completed. The data collected will typically also include a variety of other operational measures such as fuel consumption, operation speeds or more detailed reports of performance as are common under conventional EHM practices.

The operational data for the engines 12 is communicated to a control or monitoring centre where records for all engines in the fleet are gathered. This is achieved by transmission of operational data, typically at the end of each aircraft flight, from the engine or associated aircraft to a control centre server 14. In the embodiment shown, one or more wireless transmitters 16 associated with each engine transmit data signals to a receiver 18, which may comprise a base station, for example within a cellular or mobile telecommunications network. Alternatively, the receiver 18 could comprise a Wi-Fi® or other radio receiver. The data is transmitted from the receiver 18 to the server 14 via a wide area network (WAN) such as the internet 20.

It will be appreciated that a variety of methods for transmission of operational data may be used which may include different wireless data transmission standards or protocols or else a wired connection between an engine, or aircraft, and the internet 20 whilst the aircraft is on the ground. Alternatively operational data may be recorded to a removable data storage device such as a memory stick, laptop or even paper records or documentation for subsequent retrieval by and/or transmission to the server 14. Furthermore it is possible that data, typically a subset of the recorded data, can be transmitted to ground during a flight using, for example, satellite communication instead of waiting for an aircraft to have landed.

The server 14 is associated with a network 22, typically a secure local area or wide area network, over which the operational data can be disseminated for processing and or analysis using networked work stations 24. The combination of server 14 and network 22 is generally described herein as a monitoring or control centre and may comprise an asset monitoring service provider or else the asset operator organisation. The network 22 comprises a data store 25, at which operational data received from the assets being monitored is stored such that it can be later accessed for processing. Conventional large-capacity, commercial data storage units or systems may be used for this purpose.

Depending on the particular setup for asset monitoring and control, the operational data may be communicated to both a service provider and also the asset operator. This is depicted by another server 14A and secure network 22A. Operational data may be transmitted to both servers 14 and 14A or else to the service provider only. The service provider may then process the data and make available a subset of data or else the results of the data processing to the asset operator, either by transmission thereof or else by hosting a web site which is accessible to the asset operator via the internet 20 or other network.

In any of the above described embodiments, the operational data is processed so as to allow planning and scheduling of required maintenance events. Such processing it typically carried out by processing means at the service provider, such as server 14, workstations 24 and/or a mainframe system. It is also possible that such processing could be carried out on-board an aircraft alone or else by processing means mounted on an engine 12 and subsequently communicated to the relevant monitoring or control centre.

Also shown in FIG. 1 is a further data store 26 which is accessible to the processing means responsible for processing the EHM data, in this embodiment via a wide area network (WAN) such as the internet 20. Although not shown in FIG. 1, the further data store 26 will typically have a server and a further network associated therewith. In this embodiment, the further data store 26 is operated by a third-party service provider which disseminates information pertaining to monitored environmental or meteorological conditions over a wide geographic area. Accordingly, the further data store 26 comprises meteorological condition data which is accessible to the asset monitoring service provider. Such services may be accessed, for example, from the Met Office® in the United Kingdom or any one of the nine, currently-established Volcanic Advisory Alert Centres (VAACs).

Meteorological data may be received from the data store 26 at predetermined time intervals or else may be triggered by specific events. In the present example of ash cloud monitoring, an event, such as a volcanic eruption, may trigger the need to receive or collect data from the data store 26 by the asset monitoring service provider. After the triggering event, meteorological data may be collected at predetermined intervals, such as daily or else at multiple times during a day, until it is determined that the need to receive data pertaining to that event has transpired. For an ash cloud, the determination of dispersal of the ash cloud, or the reduction of airborne ash particle concentration below a threshold level, is used to trigger cessation of monitoring for that event. In further developments of the invention it is envisaged that it would be possible to proactively collect data, such as meteorological data, on a routine basis as part of a routine monitoring activity. Thus a routine instance of data collection may trigger the further collection of data at an increased frequency or sampling rate.

Figure 2:
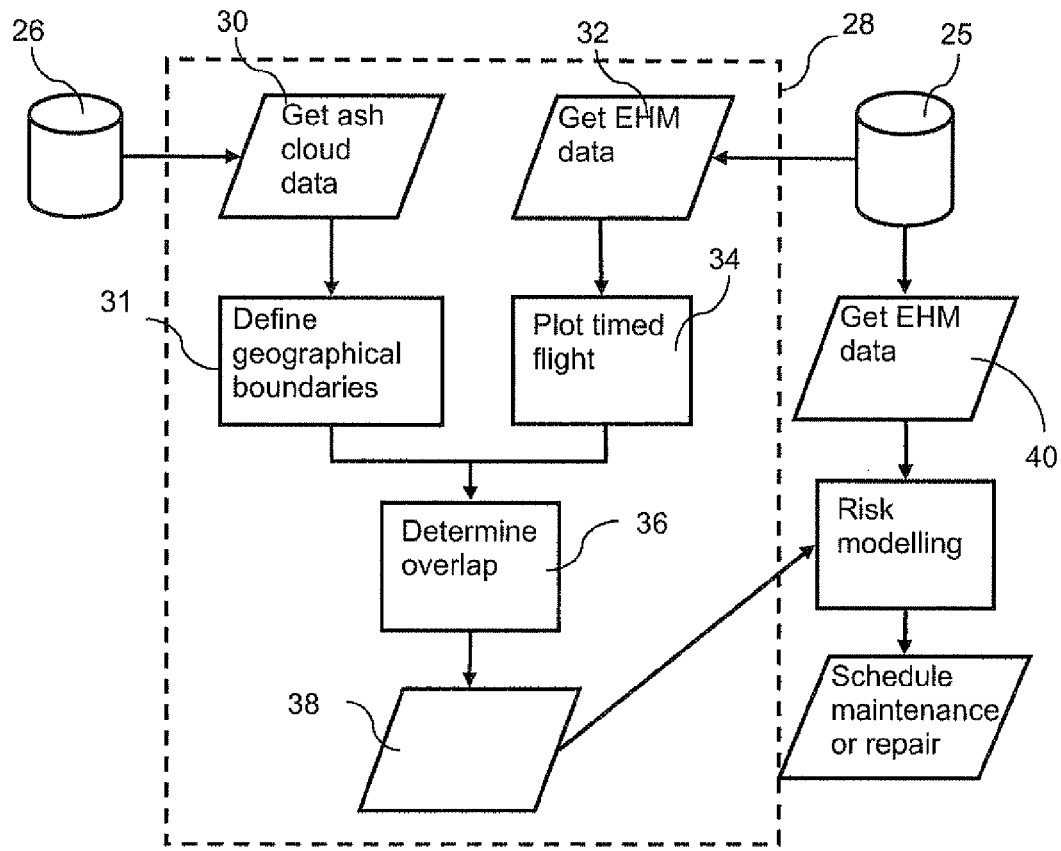
FIG. 2 shows a flow diagram of stages performed according to one embodiment of the invention.

A flow diagram showing the basic stages performed according to one embodiment of the invention is provided by FIG. 2. The stages contained within the area enclosed by dashed line 28 are carried out by suitable processing means, such as workstation 24, running one or more modules of machine readable code in the form of a program. In such an embodiment the output of the program running on the workstation can be fed into a larger equipment health monitoring process as will be described below. However in other embodiments, the entire EHM process, or parts thereof could also be carried out by the same processing means.

Figure 3:
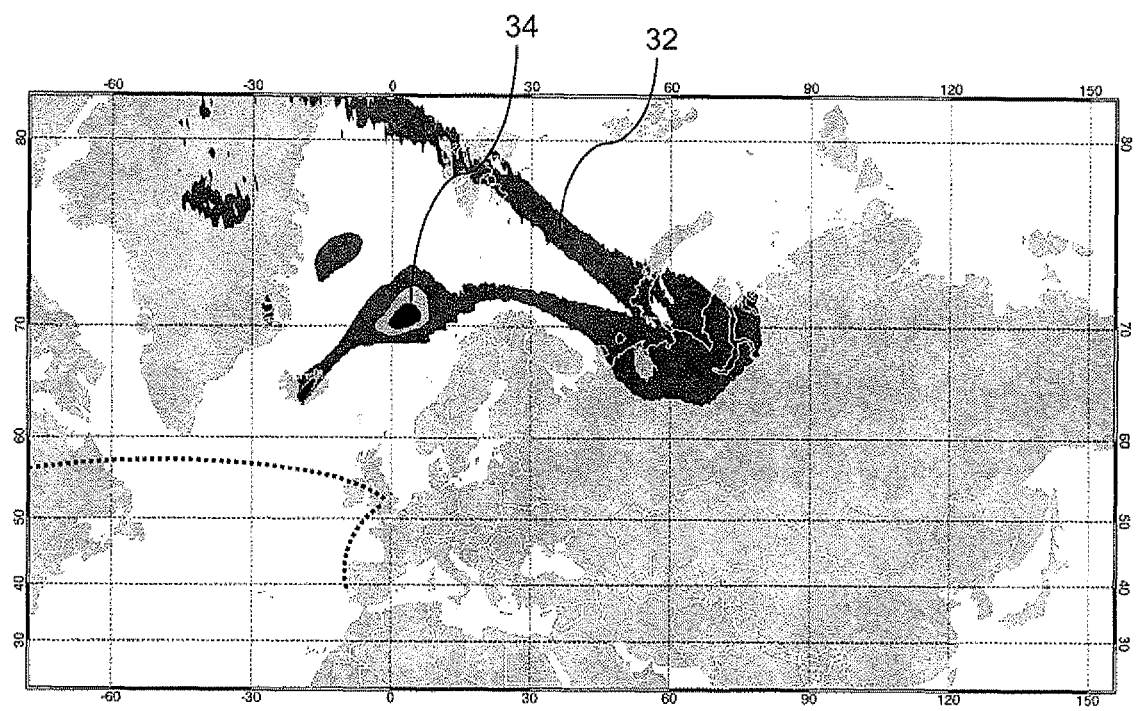
FIG. 3 shows a graphical output of one embodiment of the invention.

At 30, the above-described environmental condition data from data store 26 is retrieved, typically via local data store 25 or else from another memory device, such as the workstation internal memory, at a workstation 24. Dependent on the form of the data received at 28, pollutant concentration and associated geographical location or co-ordinate data may be processed to generate or define a geometric shape representative of the pollutant location at 31. A graphical output of the shape data may be output of the type shown in FIG. 3, which shows a map and the corresponding ash cloud location as polygon 32. Whilst a polygonal definition of the ash cloud may be suitable for certain purposes it is preferable that the shape is represented in three dimensions, typically as a polyhedron, so as to also accommodate the height of the ash cloud above ground. A polyhedral definition of the ash cloud allows determination or inference of both area/volume and location.

The determined shape may be defined as a boundary about an area/volume at which the concentration of airborne ash or other material is at or greater than a predetermined threshold value. Accordingly, within that shape, additional shape(s) 34 may be determined, defining boundaries about areas/volumes in which the concentration is at or greater than a further threshold value. Accordingly different zones of concentration (and associated operational risks) can be defined.

Returning to FIG. 2, the software imports EHM data from database 25. In this embodiment the method uses EHM data to determine one or more locations of aircraft over a given time period under investigation, comprise a single flight of the aircraft. However the concept can be extended to cover multiple flights and/or a specified time period of days or weeks to accommodate the movements of one or more aircraft over that time period. Accordingly the method can be carried out either in advance, concurrently or after an event or aircraft flight provided the aircraft route is known.

The EHM data is received at stage 32 and comprises at least city-pair and date/time information for one or more aircraft flights, including take-off and, possibly also, landing times.

However landing times may alternatively be calculated or estimated from known distances between city pairs and average cruise times. If not available within the EHM data, the corresponding locations for the airports at each of the city-pair entries are obtained, typically as GPS coordinates. Using this data and/or historical flight path data, it is possible to plot a timed flight path for each aircraft flight at 34. Whilst this represents one embodiment of the invention, it is also possible that further EHM data can be used to determine the location of the aircraft/asset at a plurality of times during the flight. Such data may include times, altitude, velocity/speed and direction of the aircraft at a plurality of different points during the flight. The points may correspond to different flight phases and/or a plurality of regularly spaced time increments over the duration of the flight. Using such EHM data, it is possible to determine the location of the aircraft at those points in time, starting from a known geographical location and height at ground level such that a bespoke plot of the flight can be determined. The accuracy that can be obtained using such EHM data is particularly suited to the provision of a formal, rather than estimated, risk associated with the flight of an aircraft in the proximity of adverse environmental conditions.

In other embodiments, engine performance parameters may be used including gas path temperatures, pressures, spool speeds and ambient measurements acquired from an engine during specific phases of system operation, such as flight phases.

The EHM data may be stored as an asset tracking data set comprising any or any combination of the above data types. In this embodiment, the data set comprises, for each start and end destination of a flight (i.e. a city pair), a date/time record; a destination name; and, airport locations and/or coordinates, expressed as latitude and longitude values.

In one specific embodiment, the received environmental condition data may be stored as a record comprising: a serial number for the asset; a date/time record; an identifier for the ash cloud or other environmental event or feature; a duration; a set of entry or start coordinates for the time period; and, a set of exit or end coordinates for the time period. The polyhedron data may be stored as a data set comprising: a polyhedron identifier; coordinate data; a period of validity; a maximum density of airborne material; height ceiling; a data source identifier; and, an airborne material category (such as ash, ice, or other material).

Where a plurality of polyhedrons is modelled, each one is recorded.

At stage 36, the known, three-dimensional, location data for the asset is compared to the location of the adverse environmental condition, embodied by the, or each, polyhedron for the ash cloud, at the corresponding times to determine whether the asset passed through the adverse environmental conditions.

A count of passage through the, or each, polyhedron, for example corresponding to passage through the ash cloud, can thus be recorded for each asset. This record may include not only a count of passage through an adverse environmental condition but also a count of passage through different zones thereof, according to the different recorded polyhedral. In this manner a level of exposure or operational risk associate with each engine, aircraft or other asset is determined and recorded. That record can then be output by the program at step 38. In more detailed configurations, the report may include not only a count of passage through one or more polyhedral, but also the duration of passage of the asset therethrough.

The output from the program at 38 may comprise a graphical or tabular display. A display may be returned in response to a user enquiry or interrogation regarding the exposure of one or more assets to the environmental and may comprise a count value or other operational risk indicator, as well as any of the above defined data types for that asset. Additionally or alternatively, a graphical output of the type shown in FIG. 3 can be output, showing a map on which both the environmental hazard, by way of polygons 32, 34, and also the flight paths for the asset under investigation are displayed for a given time period. In this manner, either or both a visual report and a textual/numerical report of asset exposure can be output. The output may be displayed on screen, printed and or else the relevant data stored to a suitable storage medium for subsequent retrieval/display.

Whilst the outputs described above may, in themselves, provide significant benefits, in one specific embodiment of the invention, data output by the program and/or asset monitoring system is used in a wider EHM system as will be described below.

Such a wider or conventional EHM system may operate within the framework of FIG. 1, such that EHM data is gathered from an asset, such as an aircraft or aircraft engine, and communicated to an asset monitoring service provider. That EHM data is retrieved at 40 and processed according to conventional EHM techniques, which will not be described in detail here for conciseness.

Figure 4:
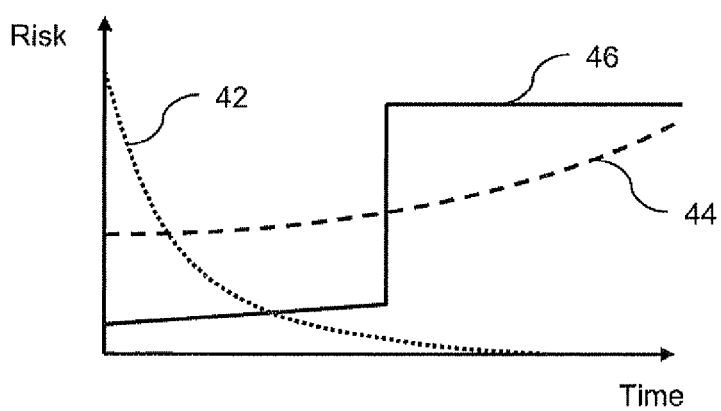
FIG. 4 shows a schematic chart of risks which may be modelled in accordance with one implementation of a system according to the invention.

Such EHM techniques allow for the modelling of a number or risks that may be associated with an asset's operation. Turning now to FIG. 4, there is shown an example of different types of risks which may apply to a gas turbine engine (GTE) or other complex machinery and how they are considered to vary over time. Any perceived risks, threats or limits which are applicable to the operation of GTEs can be modelled in this manner. In this example, line 42 represents the risk of an infantile failure for a GTE which may be related to, for example, a manufacture batch issue or maintenance. This risk is maximal at the start of the GTE operational life (or initial period after maintenance) and decays over time such that the risk is considered negligible beyond a predetermined duration of use thereafter. Line 44 represents an age related reliability risk which starts at an initial risk level and rises with increasing gradient over time.

Line 46 represents an operational, commercial or regulatory limit such that the associated risk adopts a lower value prior to the limit and then undergoes a step change such that the risk adopts a higher value thereafter. It is in this manner that the output of environmental assessment described above can provide an input into the larger EHM framework. Thus the output count or duration of passage of the asset through a modelled adverse environmental zone can be modelled as such an operational risk that feeds into a higher level risk assessment. A single count of passage through any modelled adverse environmental region may be sufficient to register as a quantified risk within the EHM system. Multiple counts or a duration of passage that is equal to, or above, a threshold amount may be modelled as an increased level of risk. Similarly, a count of passage through a zone 34 of higher concentration of ash or other airborne material may also be modelled as an increased level of risk.

Actual identified risks can be attributed to a particular risk type and modelled accordingly by applying characteristic values such as, for example, base level risk, rate of increase or decay, limit values and/or magnitude of step changes.

Whilst each of the types of risk identified in FIG. 4 adopt a similar scale or magnitude of risk, a real life scenario may include risks of significantly different magnitudes dependent on the likelihood of the risk coming to fruition and/or the likely level of impact of such an occurrence on the operation of the GTE. Accordingly risks can be weighted within the model to ensure they accurately reflect a real scenario.

In a further embodiment, estimates of risk for an asset may be refined still further by analysis of the above described condition indicators using a physics based model. Thus, more detailed models to identify the underlying operational reasons for risks occurring due to contamination by airborne particulates can be used for individual components or assemblies. The results of such models can therefore provide a prediction of the expected proportion of ingested particulates, for a known concentration at a given operating condition, for a known duration. Thus the accuracy of the risk modelling can be increased for specific risks which are identified as problems relating to the particular type of adverse environmental conditions being monitored.

The modelled levels of risk faced by the asset are then compared to predetermined risk thresholds to determine whether maintenance work for the asset is required in order to be able to continue operation. For lower levels of risk or less critical types of risk, the asset may continue operation and a suitable maintenance slot may be scheduled based on availability and a hierarchy of importance within a plurality of assets, such as a fleet of aircraft or engines. For higher levels of risk, the operational limits may be placed on of the asset and communicated to the asset operator. Additionally or alternatively in severe cases, the asset may be removed from service immediately such that maintenance work can be undertaken before any further operation of the asset is undertaken.

Such maintenance can be scheduled when either a total, cumulative risk for an engine exceeds a total threshold value, or else when individual risks exceed individual threshold values assigned thereto. Thus a single instance of passage through adverse environmental conditions may be sufficient in itself to cause a maintenance event to be scheduled. Additionally or alternatively, one or more instance of passage through adverse environmental conditions may contribute to a wider consideration or total or other related risks at either a component, sub-assembly or whole asset level such that a maintenance decision can be made based on combined aspects of risk. In this manner levels of exposure determined by the program steps 28 for ash cloud monitoring are converted to associated risks from accumulated counts within specific density bands of ash-cloud. Such accumulation figures can then be used to determine severity and hence drive maintenance decisions.

The above-described capabilities can be used as a fleet management tools and consequently provides a simple and rapid mechanism for prioritising maintenance of engines affected by exposure to volcanic ash or other airborne particulates. The capability can also be used to reduce time associated with root-cause analysis associated with in-service events related to a range of unusual weather conditions such as icing events, airborne pollution, sand-storms, dust clouds, etc. for a number of different types of vehicles.

It is envisaged that such estimates of contamination will be calculated routinely for all systems comprising an operational fleet and will therefore serve as a fleet management tool to direct maintenance on a priority basis.

In a further embodiment, it is possible that the invention may access historical flight path data to infer future flight path data and thereby predict future flight paths for aircraft, such that flight paths which can be determined to pass through adverse environmental conditions in a manner (duration, count or severity) that would cause a particular asset to be exposed to an unacceptable or unwanted level of risk can be altered accordingly or else avoided altogether until the environmental condition being monitored has moved away from the flight path or else subsided. In this manner aircraft flight paths can be reorganised with greater certainty and with reduced disruption to aircraft operators. Fewer aircraft may need to be grounded due to adverse conditions, such as ash clouds, and decisions as to which aircraft do need to be grounded can be made with greater certainty, thereby improving safety.

The terms 'maintenance' and 'maintenance events' are used hereinafter to refer to any kind of actions which may be required to ensure correct functioning of an asset and which may include any or any combination of asset inspection, checking, testing, servicing, repair, overhaul, recall, adjustment, renovation, cleaning or the like. In the embodiments described above in relation to ash ingestion by a gas turbine engine, it is envisaged that maintenance may particularly consist of inspection by way of chemical swabs of affected component surfaces; boroscope inspection; and/or replacement of damaged components.

The above description could be applied to gas-turbine assets operating in civil aerospace, military, marine, and energy applications. Indeed any application sector where assets (fixed or mobile) are likely to encounter effects on their operation as a result of extreme weather conditions or airborne pollutants. Whilst the present invention is particularly suited to aeroplanes, helicopters or other aircraft, it may similarly be adapted for use in conjunction with water-borne materials for ships or other watercraft or vessels or high-value machinery on land based vehicles. The system may be used for ash cloud impact monitoring for aircraft, a fleet of aircraft or aircraft engines.

The invention claimed is:

1. An asset operational health monitoring system, comprising:
    a plurality of sensors arranged to determine values of asset operation parameters pertaining to an instance of asset operation; and
    one or more processing units arranged to receive data corresponding to said asset operation values and to determine a plurality of asset locations at a corresponding plurality of points in time;
    wherein the one or more processing unit is arranged to receive data indicative of the location of a region of adverse environmental conditions which may impact on the operation of the asset and to compare the determined locations of the asset with the location of said region so as to determine whether one or more of said asset locations fall within said region,
    wherein the one or more processing units outputs an indicator of maintenance risk associated with the presence of said asset in said region, the indicator of maintenance risk comprising (1) a count of the number of instances of exposure of the asset to one or more of said regions of adverse environmental conditions or (2) a value of duration or level of exposure of the asset to said one or more regions of adverse environmental conditions, and
    wherein the asset is a gas turbine engine.

2. A system according to claim 1, wherein the location of the asset and/or the region of adverse environmental conditions comprises two-dimensional co-ordinates.

3. A system according to claim 2, the location of the asset and/or the region of adverse environmental conditions further comprises an altitude value.

4. A system according to claim 1, wherein the region of adverse environmental conditions is defined as a polyhedron or polygon.

5. A system according to claim 1, wherein a plurality of regions of adverse conditions are defined, each of said regions corresponding to different severities of said adverse conditions.

6. A system according to claim 1, wherein a boundary of the one or more region of adverse conditions is defined where an environmental condition parameter is approximately equal to a threshold parameter value.

7. A system according to claim 6, wherein the region of adverse conditions comprises a region in which a contaminant is present and the environmental condition parameter comprises a concentration of said contaminant.

8. A system according to claim 1, wherein the determination of asset locations is performed by processing equipment health monitoring data comprising city-pair and/or date/time information for one or more aircraft flights.

9. A system according to claim 1, wherein the one or more processing unit outputs a maintenance indicator for said asset.

10. A system according to claim 9, wherein the maintenance indicator comprises a scheduled maintenance event for said asset based at least in part on said determination of maintenance risk.

11. A system according to claim 1, wherein the one or more processing unit receives data pertaining to a plurality of operational parameters for said asset and inputs said data into one or more maintenance risk models in order to determine the operational health of the asset, wherein the determination of whether one or more of said asset locations falls within said region of adverse conditions is used in conjunction with said maintenance risk model to determine the operational health of the asset.

12. A system according to claim 11, wherein a maintenance decision is output for said asset based on a combination of the output of said risk model and the determination of whether one or more of said asset locations falls within said region of adverse conditions.

13. A tool for monitoring a plurality of operational assets, the tool being arranged to receive asset operation parameter data and to determine a plurality of asset locations at a corresponding plurality of points in time for an instance of asset operation; the tool being further arranged to receive data indicative of the location of a region of adverse environmental conditions for the asset and to compare the determined locations of the asset with the location of said region so as to determine whether one or more of said asset locations fall within said region, wherein the tool outputs an indicator of maintenance risk associated with the presence of said asset in said region, the indicator of maintenance risk comprising (1) a count of the number of instances of exposure of the asset to one or more of said regions of adverse environmental conditions or (2) a value of duration or level of exposure of the asset to said one or more regions of adverse environmental conditions, and wherein the asset is a gas turbine engine.

14. A method of monitoring the operational health of an asset, the method comprising:
 receiving data comprising asset operation parameter values;
 determining a plurality of asset locations at a corresponding plurality of points in time;
 receiving data indicative of a location of a region of adverse environmental conditions which may impact on the operation of the asset;
 comparing the determined asset locations with the location of said region at said plurality of points in time so as to determine whether one or more of said asset locations fall within said region; and,
 outputting an indicator of maintenance risk associated with the presence of said asset in said region, wherein the indicator of maintenance risk comprises (1) a count of the number of instances of exposure of the asset to one or more of said regions of adverse environmental conditions or (2) a value of duration or level of exposure of the asset to said one or more regions of adverse environmental conditions, and wherein the asset is a pas turbine engine.

15. A method according to claim 14, wherein the operation parameter values comprise operational condition indicators, the method comprising constructing an operational condition signature for said condition indicators.

16. A method according to claim 14, wherein the receiving data indicative of the location of adverse environmental conditions comprises collecting a condition signature consisting of a plurality of geographical and altitude coordinates from one or more meteorological data capture systems.

17. A method according to claim 14, wherein the region is defined as a volume in which airborne particulate material is determined to be at or above a threshold concentration value.

18. A method according to claim 14, wherein the asset locations may be determined as, or converted into, GPS coordinates.

19. A method according to claim 14, wherein events corresponding to exposure of the machine to one or more of said regions of adverse conditions are logged and an accumulation of said events is used to provide the operational maintenance risk indicator for the machine, upon which operational decisions for the asset are made.

* * * * *